United States Patent [19]

Gluck et al.

[11] Patent Number: 4,795,763

[45] Date of Patent: Jan. 3, 1989

[54] CARBON BLACK-FILLED FOAM

[75] Inventors: David G. Gluck, St. Petersburg; Thomas G. Soukup, Clearwater; William J. Moore, Seminole, all of Fla.

[73] Assignee: The Celotex Corporation, Tampa, Fla.

[21] Appl. No.: 182,600

[22] Filed: Apr. 18, 1988

[51] Int. Cl.$^4$ ............................................. C08G 18/14
[52] U.S. Cl. .................................... 521/99; 521/917
[58] Field of Search .......................................... 521/99

[56] References Cited

U.S. PATENT DOCUMENTS

| | | | |
|---|---|---|---|
| 3,640,920 | 2/1972 | Cear | 260/2.5 |
| 4,153,764 | 5/1979 | Blount | 521/155 |
| 4,258,222 | 3/1981 | Mohring et al. | 568/863 |
| 4,265,965 | 5/1981 | Chancler | 428/315 |
| 4,346,180 | 8/1982 | Blount | 521/100 |
| 4,431,575 | 2/1984 | Fujie et al. | 252/502 |
| 4,454,248 | 6/1984 | Pollock et al. | 521/53 |
| 4,493,788 | 1/1985 | Fujie et al. | 252/511 |
| 4,525,297 | 6/1985 | Yamane et al. | 252/511 |
| 4,608,446 | 8/1986 | Mohring et al. | 568/863 |
| 4,649,162 | 3/1987 | Roche et al. | 521/78 |

FOREIGN PATENT DOCUMENTS

| | | |
|---|---|---|
| 26920 | 2/1980 | European Pat. Off. . |
| 72536 | 8/1982 | European Pat. Off. . |
| 79080 | 11/1982 | European Pat. Off. . |
| 208809 | 10/1985 | European Pat. Off. . |
| 186887 | 12/1985 | European Pat. Off. . |
| 57-147510 | 9/1982 | Japan . |
| 1283228 | 7/1969 | United Kingdom . |
| 1283229 | 7/1969 | United Kingdom . |
| 1402372 | 7/1972 | United Kingdom . |

OTHER PUBLICATIONS

Schuetz, M. Q., "Heat Transfer in Foam Insulation," M.S. Thesis, Massachusetts Institute of Technology, Dec., 1982, pp. 240-254.

Primary Examiner—Maurice J. Welsh
Attorney, Agent, or Firm—James W. Grace; Charles W. Vanacek

[57] ABSTRACT

A closed cell, rigid, polymer foam containing as filler at least about 2 percent by weight of carbon black, based on the weight of the polymer in the foam, the carbon black being uniformly dispersed throughout the foam so that there is present in the cell walls of the foam an amount of carbon black which reduces the aged k-factor of the foam to below the aged k-factor of the corresponding unfilled foam.

26 Claims, 8 Drawing Sheets

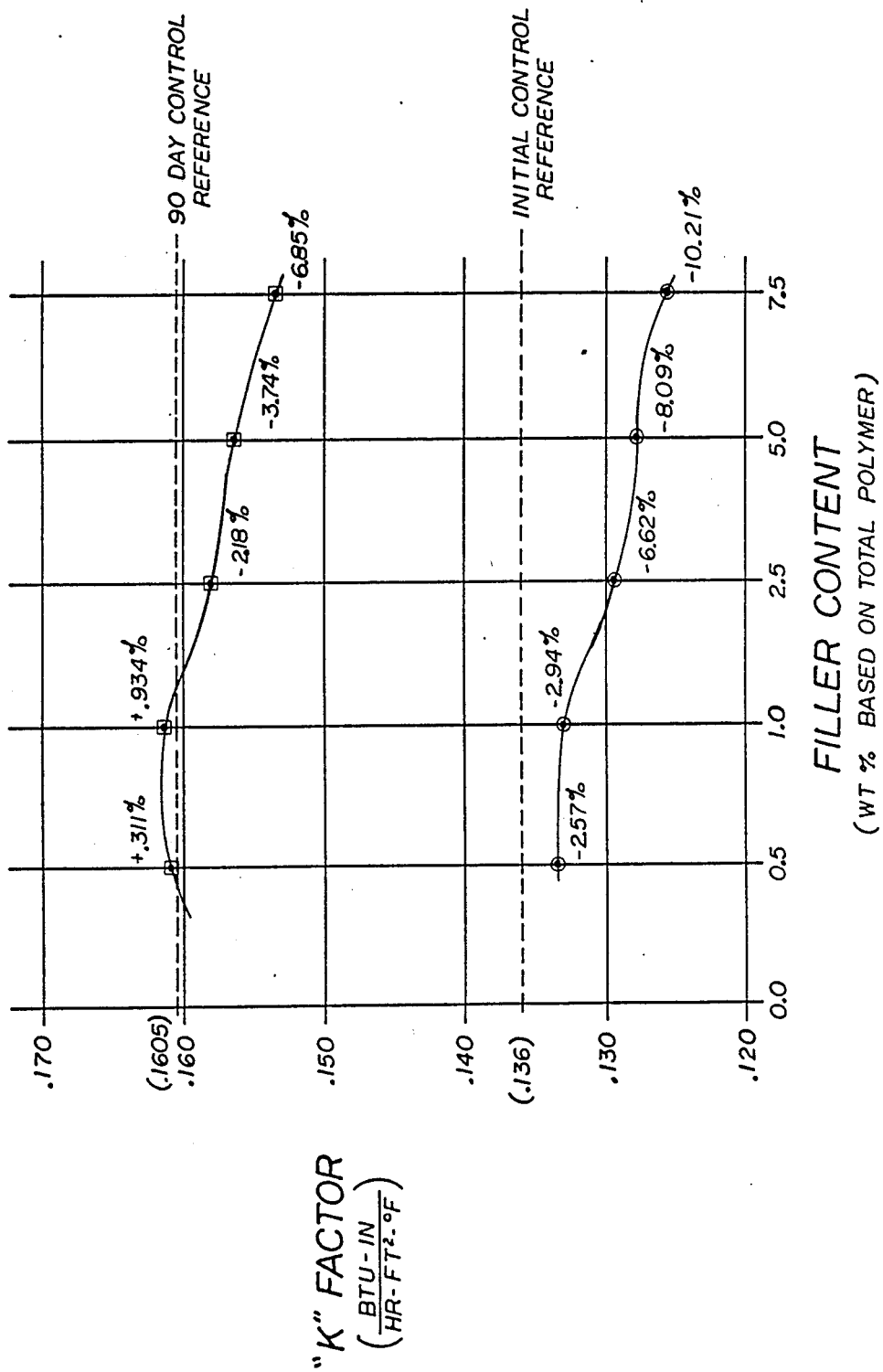

4,795,763

CARBON BLACK-FILLED FOAM

BACKGROUND OF THE INVENTION

1. Field of the Invention

This invention relates to foam insulating products, particularly polyurethane and polyisocyanurate foams, containing carbon black as a filler and to a process for providing the insulating products.

2. Description of the Prior Art

The usefulness of foamed plastic materials in a variety of applications is well known. Rigid polyurethane and polyisocyanurate foams, for instance, are widely used as insulating structural members. It would be highly desirable to reduce the polymer content and concomitantly the cost of these members by the addition of fillers. The incorporation of fillers in the foam-forming reaction mixture has been repeatedly proposed in a general fashion in the prior art but little concrete evidence of such filler utilization has been described; see, for example, U.S. Pat. Nos. 3,644,168, 4,092,276, 4,110,270, 4,165,414, 4,248,975, 4,366,204, 4,467,014 and 4,649,162, and Canadian Pat. No. 853,771. This failure to broadly utilize fillers in rigid insulating foams is explainable because the advantages of adding the fillers have been perceived to be outweighed by the problems involved in incorporating them in the foam, maintaining the overall good foam quality, etc.

Japanese patent application, laid open as No. 57-147510, describes the use of carbon black in rigid foam plastics but reports k-factor reductions of less than 4% achieved with maximum carbon black levels under 0.7 weight percent. Nothing is disclosed in the application regarding the effect of aging on the k-factor of the filled foams. Although the degree of success reported in this Japanese application justifies little interest in carbon black as a filler for foams, it would be a considerable advance in the art to provide a filled, rigid foam characterized by reduced cost and a significantly improved insulating value.

OBJECTS OF THE INVENTION

It is therefore an object of the present invention to provide an improved method for the production of a filled, rigid, highly insulating foam plastic in a simple and economical manner.

It is another object of the present invention to produce a filled, rigid foam plastic which exhibits overall good properties, including excellent thermal insulative properties, good dimensional stability, thermal resistance, and compressive strength and acceptable friability.

It is a further object of the present invention to produce filled, closed cell foam materials which can be used in building panels having superior insulating and fire resistant properties.

These and other objects and advantages of the present invention will become more apparent by reference to the following detailed description and drawings wherein:

FIG. 1 is a schematic elevation of an apparatus suitable for practicing the process of the invention in a free-rise mode; and FIGS. 2 to 8 are a series of graphs showing the relationships between the k-factor of various filled foams and the content of the material used as filler in these foams.

SUMMARY OF THE INVENTION

The above objects have been achieved through the development of a rigid plastic foam which contains carbon black as a filler material to improve the insulating qualities of the foam. The carbon black is uniformly dispersed throughout the foam product and is employed in an amount sufficient to increase both the initial and aged insulation value, i.e., R-value, of the product to above the respective insulation values it would have with the carbon black omitted. Any carbon black which can be uniformly dispersed in the foam at levels of about 1-20, preferably 2 to 10, weight %, based on the weight of the polymer in the foam, can be used for improvement of insulation value.

In the broadest aspects of the present invention, the rigid foamed plastic materials may be any such materials described in the prior art. Examples of these materials are polyurethane, polyisocyanurate, polyurea, polyolefin, polystyrene, phenol-formaldehyde, epoxy and other polymeric foams. The invention finds greatest utility when the foamed plastics are of the rigid type used to provide high efficiency insulation, especially rigid polyurethane and polyisocyanurate foams.

More particularly, the invention relates to the production of a closed cell, rigid, polymer foam prepared from a polymer foam-forming composition containing a foaming agent, the foam containing as filler at least about 2 percent by weight of carbon black, based on the weight of the polymer in the foam, the carbon black being uniformly dispersed throughout the foam so that there is present in the cell walls of the foam an amount of carbon black which reduces the aged k-factor of the foam to below the aged k-factor of the corresponding unfilled foam having approximately the same density and prepared from the same foam-forming composition as the filled foam except that the carbon black is omitted and the amount of foaming agent is decreased to equalize the densities of the filled and unfilled foams.

DETAILED DESCRIPTION OF THE INVENTION

Figure 1:
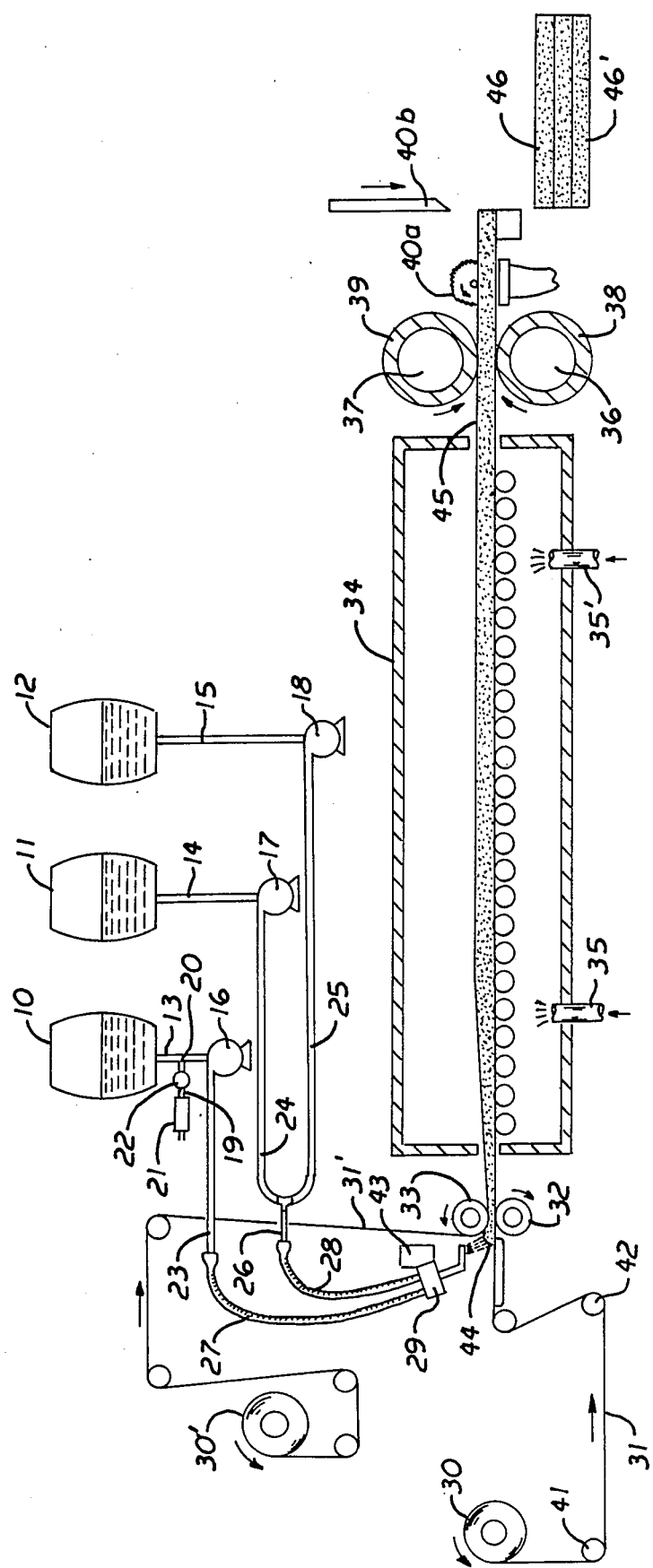
Figure 2:
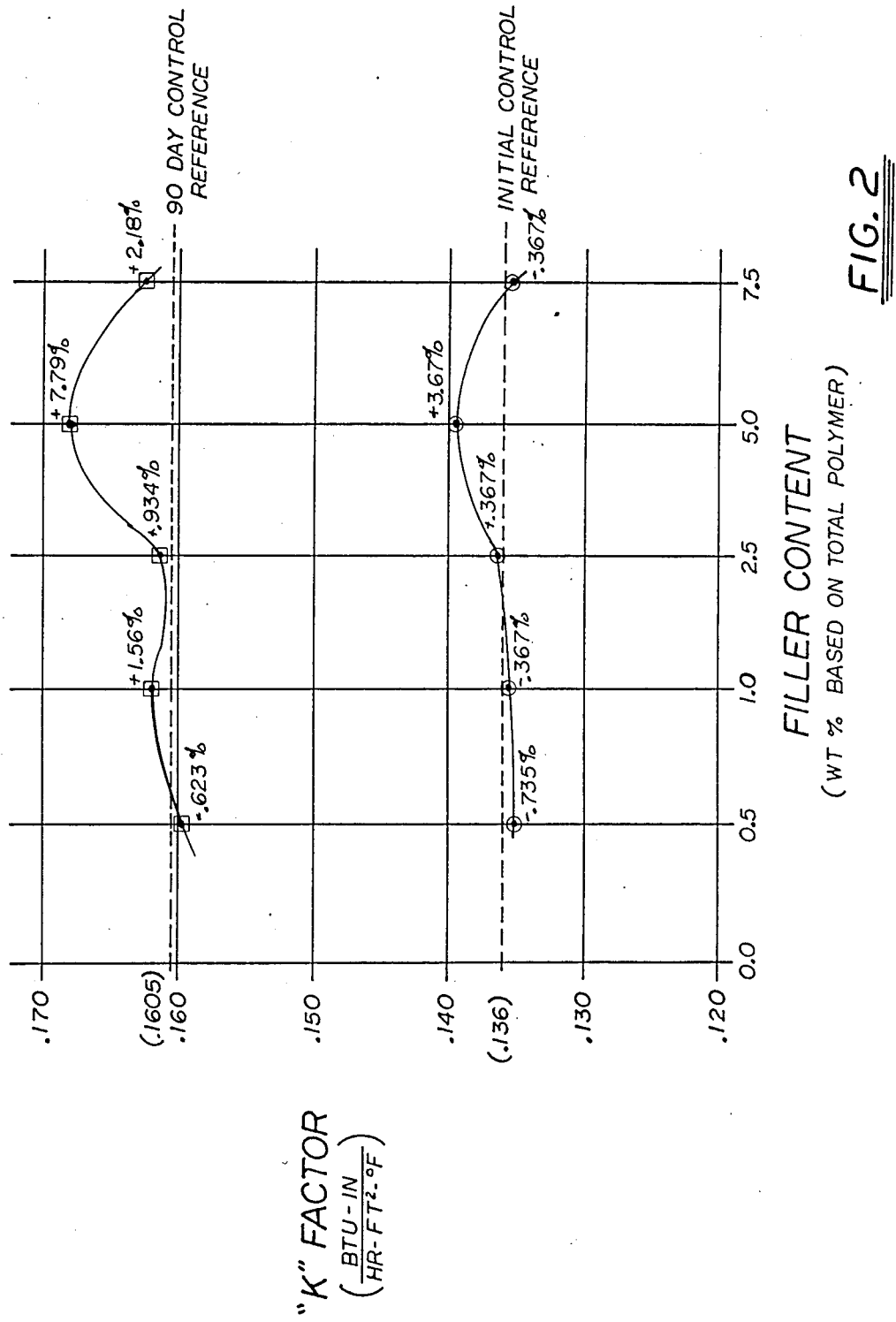
Figure 3:
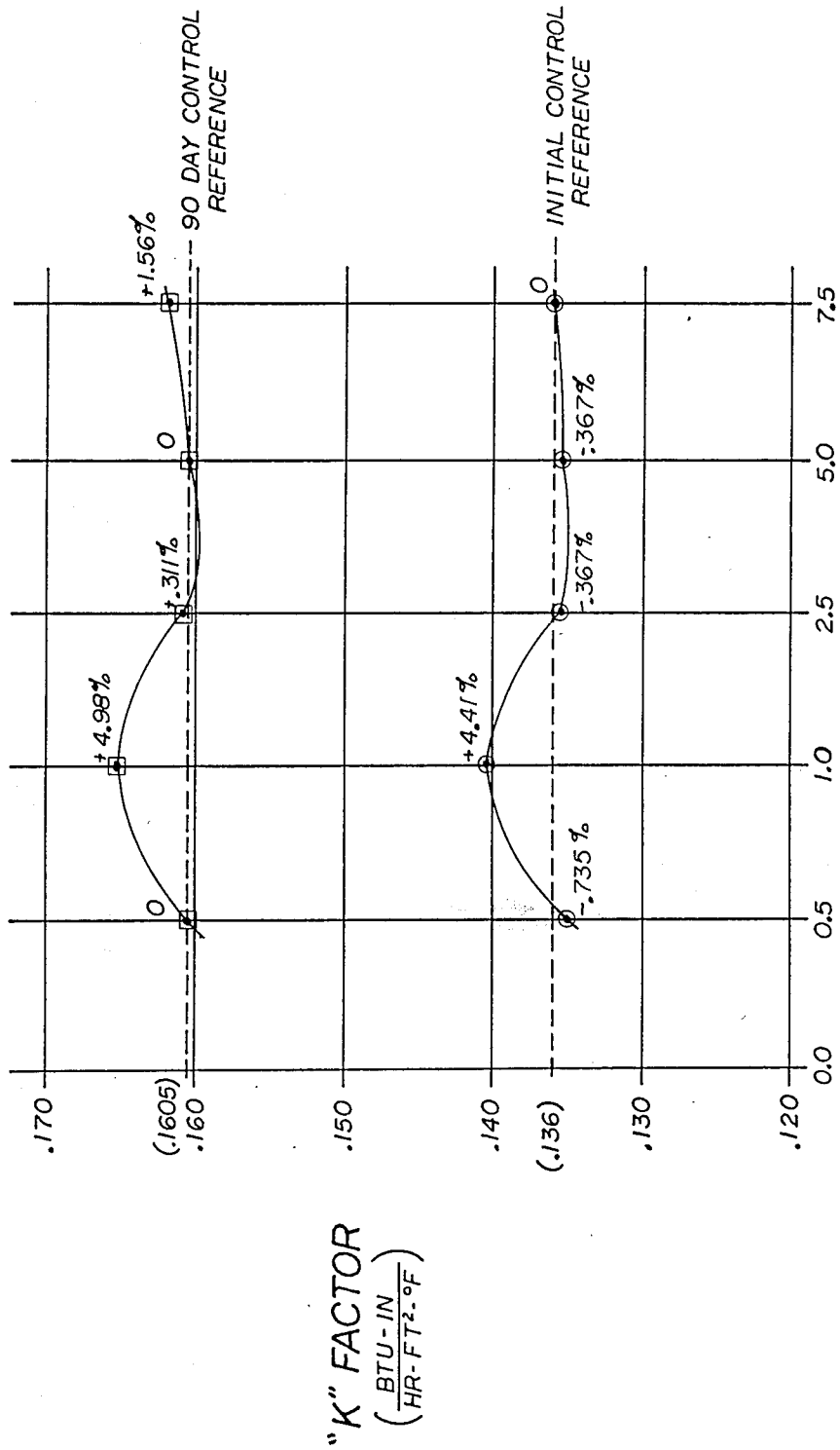
Figure 4:
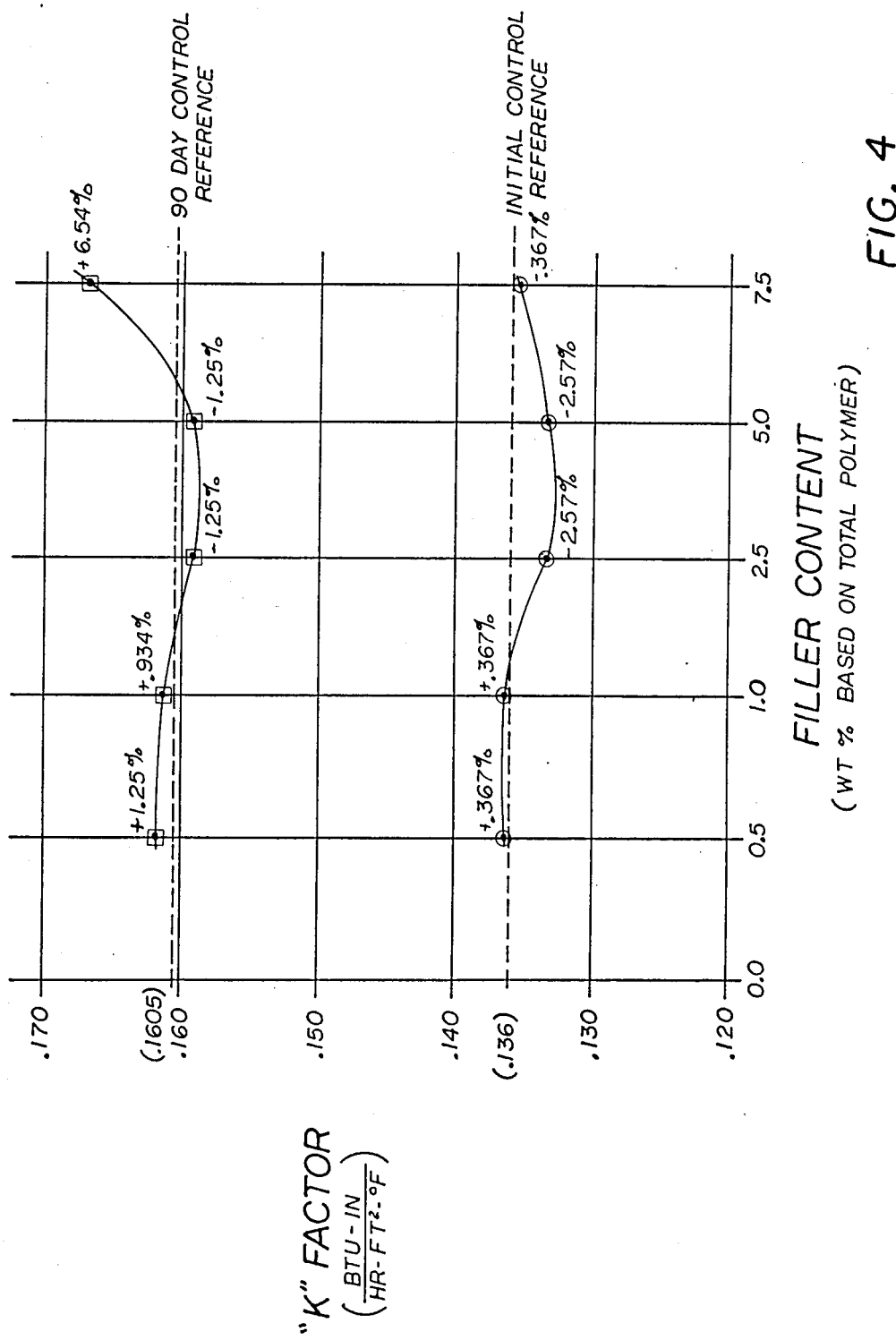
Figure 5:
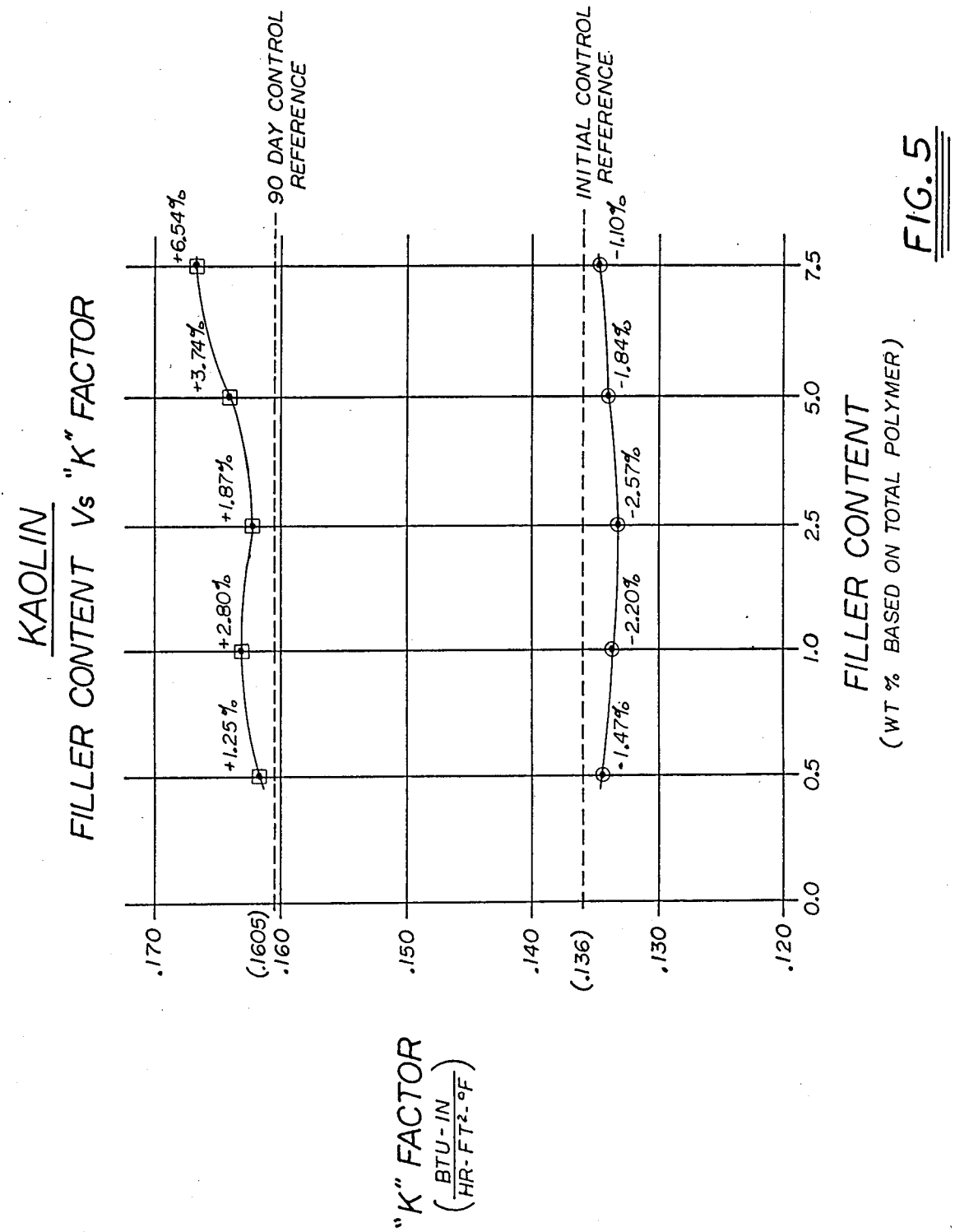
Figure 6:
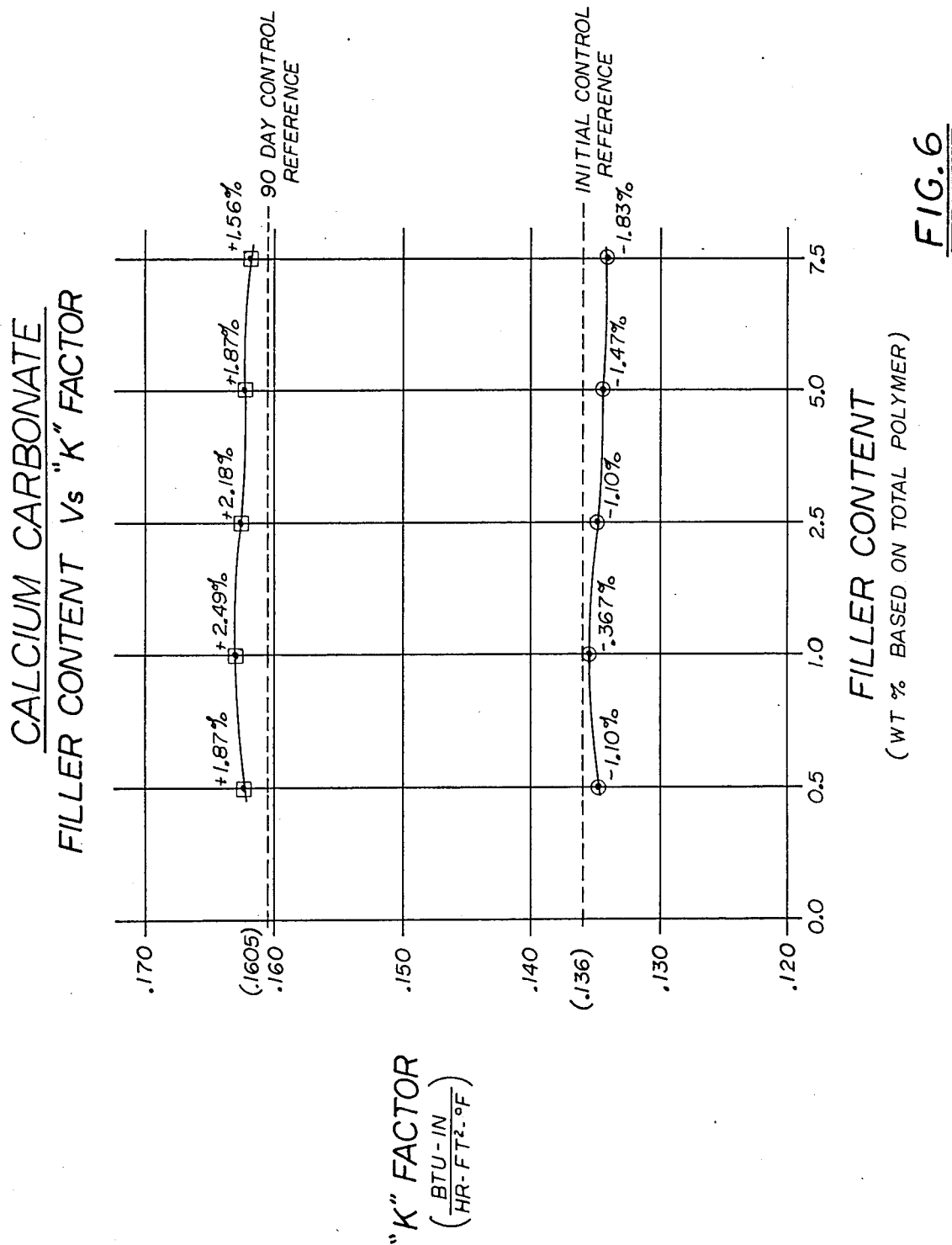

The rigid foam plastics of the present invention have improved insulating properties because of the presence of the carbon black filler. It has been discovered that a uniform dispersion of a sufficient amount of carbon black in a rigid foam brings about a significant reduction in both the initial and long-term aged k factors of the foam. For example, the preferred carbon black filled polyurethane and polyisocyanurate rigid foams of the invention exhibit k-factor reductions of as much as 14%, as compared to the unfilled foams of comparable density. This represents a substantial improvement in the insulation value or R-value of the foam, which is attained despite a reduction in product cost. The higher the R-value of a foam the greater is its resistance to heat flow, whereas the higher the k-factor the greater is the thermal conductivity or ease of heat flow through the foam.

While it is desirable to reduce the polymer content of foams by adding fillers for cost reduction, it has proven difficult to provide rigid foams, such as the polyurethanes and polyisocyanurates, which contain more than a minor proportion of the fillers. Furthermore, too much filler is known to rupture the cells of the foam, which dramatically reduces its insulative capacitive, and to cause the foam to be very friable. The disposition to use little filler in foams is revealed in Japanese patent application, laid open as No. 57-147510, which exemplifies carbon black levels of less than 0.7 weight percent, based on the weight of the reactive polymer-forming components (isocyanate and polyol components).

No significant benefit is realized from the small amount of filler used in producing the foams illustrated in the Japanese patent application. At this low level, carbon black performs much like various other conventional fillers in imparting to the foam an initially somewhat improved insulation value which unfortunately is not retained with aging. The present invention involves the surprising discovery that a substantial long-term improvement in insulation value results from the use of higher levels of carbon black than those exemplified in the Japanese application, whereas other conventional fillers, when used at the higher levels, contribute to a loss of the foam's insulation value with aging.

The amount of carbon black in the foam should be sufficient to obtain the desired level of improved insulative properties, such as a k-factor reduction of at least about 5%, which persists with aging of the foam. Typically, the amount ranges from about 1% to 10% by weight of the solid foam polymer, such as 4% to 9%, particularly 7% to 8%. The particle size of the carbon black particles to be employed may vary, but generally the carbon black has a mean particle diameter of from about 10 to 150, preferably from 50 to 100, and more preferably from 70 to 95, nm.

The carbon black may be any of the different kinds available, such as lampblack, channel black, gas furnace black, oil furnace black and thermal black. Although both fluffy and pelleted types of carbon black may be used, the pelleted carbon blacks have been found especially suitable for large-scale processing. A preferred pelleted carbon black having a mean particle diameter of 75 nanometers is available from Cabot Corporation under the trade name Sterling-NS.

Particularly suitable carbon blacks for use in the insulating foams of the present invention are non-electroconductive. The electroconductive carbon blacks are used in electroconductive foams and are generally characterized by a relatively small average particle size and large specific surface area, as compared to the non-electroconductive type. While the electroconductive carbon blacks may be used in accordance with the present invention, especially good insulating foam products contain a substantial amount of carbon black particles whose average particle diameter is larger and specific surface area smaller than the respective dimensions characterizing the carbon blacks conventionally used in electroconductive foams. The carbon black material of these highly desirable foam products of the present invention has an average particle diameter which is preferably greater than about 40, and more preferably greater than about 50, nm. This carbon black material has a specific surface area which is preferably less than about 200, more preferably less than about 142 and most preferably less than about 100, $m^2/g$.

A uniform carbon black dispersion in the finished foam product is essential for the significant improvement of insulation value in accordance with the present invention. To produce the requisite homogeneously filled foam, the carbon black is first uniformly distributed in at least one of the foam-forming ingredients by any conventional dispersing means. There must be a sufficient amount of the ingredient or ingredients which is to serve as the dispersion medium to totally disperse the carbon black and prevent its agglomeration.

The carbon black is uniformly dispersed throughout the closed cell, rigid, polymeric foams of the invention so that a sufficient amount of the carbon black becomes located in the cell walls of the foam to reduce the aged k-factor of the carbon black-filled foam to below the aged k-factor the foam would have with the carbon black omitted. The content of carbon black for optimum long-term preservation of insulation value has been found to be at least about 2, more preferably at least about 5, weight percent, and preferably is in the range from about 5 to 9, more preferably from about 5 to 8, weight percent, based on the weight of the polymer-forming reactants in the foam system. The carbon black will advantageously reduce the aged k-factor of the foam at 90 days by at least about 4, more preferably at least about 5 and most preferably at least about 6 percent, as compared to the unfilled foam having substantially the same density and prepared from the same foam-forming ingredients except for the carbon black.

The use of fine dispersions of carbon black can result in excessively high foam system viscosities which lead to incomplete chemical mixing and physical defects in the core foam, e.g., a wide variation in k-factor throughout the product. This problem can be overcome in various ways, such as through the introduction of viscosity-reducing diluents. The foam-forming ingredients themselves may function as diluents. For example, in the formation of polyurethane and polyisocyanurate foams, low viscosity isocyanates or polyols can be employed. Also, chlorofluorocarbons like dichlorotrifluoroethane, besides their role as foaming agent, can be used to reduce system viscosity, improve dispersibility of the carbon black particles, and bring about uniform physical properties throughout the foam product.

The large-scale production of carbon black-filled foam advantageously begins with the preparation of a dispersion of the carbon black filler in the foam-forming ingredient(s) which constitutes the best medium for providing the highest loading of finely divided and well-dispersed filler particles and also a workable viscosity. This pre-blended mixture is next thoroughly mixed with the remainder of the foam-forming material, and the resultant total mixture is foamed and cured. Dispersion of the carbon black is conducted to provide the finest grind of particles economically attainable for easier processing and extending the life of the process equipment.

It is common practice in the manufacture of the preferred rigid cellular polyurethanes and polyisocyanurates to utilize two preformulated components, commonly called the A-component and the B-component. Typically, the A-component contains the isocyanate compound that must be reacted with the polyol of the B-component to form the foam, and the balance of the foam-forming ingredients are distributed in these two components or in yet another component or components. In general, the carbon black may be dispersed in either the polyisocyanate or the polyol or both. Isocyanurate foams of superior insulating value have been produced by dispersing high levels of carbon black in the isocyanate component. These carbon black/isocyanate dispersions have shown excellent age stability with no settling or agglomeration of carbon black particles. Carbon black containing A-components exhibit the same stability and show no signs of particle agglomeration on addition of chlorofluorocarbon (CFC) blowing agents.

Among the numerous organic polymers which may be foamed in accordance with this invention, the following may be mentioned as examples: polystyrene, polyvinyl chloride, polyethylene, polypropylene, polyacrylonitrile, polybutadiene, polyisoprene, polytetrafluoroethylene, polyesters, melamine, urea, phenol resins, silicate resins, polyacetal resins, polyepoxides, polyhydantoins, polyureas, polyethers, polyurethanes, polyisocyanurates, polyimides, polyamides, polysulphones, polycarbonates, and copolymers and mixtures thereof.

Preferred carbon black-filled foams of this invention are rigid polyurethane and polyisocyanurate foams. In the broadest aspects of the present invention, any organic polyisocyanate can be employed in the preparation of these foams. The organic polyisocyanates which can be used include aromatic, aliphatic and cycloaliphatic polyisocyanates and combinations thereof. Such polyisocyanates are described, for example, in U.S. Pat. Nos. 4,065,410, 3,401,180, 3,454,606, 3,152,162, 3,492,330, 3,001,973, 3,394,164 and 3,124,605, all incorporated herein by reference.

Representative of the polyisocyanates are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

Prepolymers may also be employed in the preparation of the foams of the present invention. These prepolymers are prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181 (1927). These compounds and their methods of preparation are well known in the art. The use of any one specific active hydrogen compound is not critical hereto, rather any such compound can be employed herein.

The preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145.

A preferred subclass of polymethylene polyphenylisocyanates especially useful in the present invention is a mixture of those of the following formula:

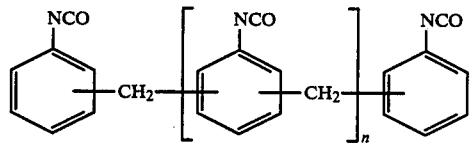

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the trade names of CODE 047 or PAPI-20 (Dow) and MR 200 (Mobay/Bayer) can successfully be employed within the spirit and scope of the present invention.

In addition to the polyisocyanate, the foam-forming formulation also contains an organic compound containing at least 1.8 or more isocyanate-reactive groups per molecule (hereinafter called "isocyanate-reactive compounds"). Suitable such compounds include polyols, polyamines, polyacids, polymercaptans and like compounds. Preferred isocyanate-reactive compounds are the polyester and polyether polyols. Particularly preferred are polyester polyols or mixtures of polyester and polyether polyols.

The polyester polyols useful in the invention can be prepared by known procedures from a polycarboxylic acid or acid derivative, such as an anhydride or ester of the polycarboxylic acid, and a polyhydric alcohol. The acids and/or the alcohols may, of course, be used as mixtures of two or more compounds in the preparation of the polyester polyols. Particularly suitable polyester polyols of the invention are aromatic polyester polyols containing phthalic acid residues.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Any suitable polyhydric alcohol may be used in preparing the polyester polyols. The polyols can be aliphatic, cycloaliphatic, aromatic and/or heterocyclic, and are preferably selected from the group consisting of diols, triols and tetrols. Aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

The term "polyester polyol" as used in this specification and claims includes any minor amounts of unreacted polyol remaining after the preparation of the polyester polyol and/or unesterified polyol added after the preparation.

The polyester polyols of the invention advantageously contain at least 1.8 hydroxyl groups and generally have an average equivalent weight of from about 75 to 500. Preferably, the polyesters contain from about 1.8 to 8 hydroxyl groups had have an average equivalent weight of from about 100 to 300, more preferably from about 120 to 250. Highly desirable aromatic polyester polyols of the invention have an average functionality of about 1.8 to 5, preferably about 2 to 2.5. Polyesters whose acid component advantageously comprises at least about 30% by weight of phthalic acid residues are particularly useful. By phthalic acid residue is meant the group

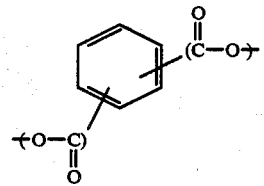

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride. These compositions may be converted to polyester polyols through conventional transesterification or esterification procedures.

While the polyester polyols can be prepared from substantially pure reactant materials, more complex ingredients are advantageously used, such as sidestream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, triethylene glycol and higher homologs or mixtures thereof. The similar homologous series of propylene glycols can also be used. Glycols can also be generated in situ during preparation of the polyester polyols of the invention by depolymerization of polyalkylene terephthalates. For example, polyethylene terephthalate yields ethylene glycol. Polyester polyols derived from raw materials containing compounds having the above defined phthalic acid residues constitute a preferred embodiment of the invention.

Preferred residues containing phthalic acid groups for reaction with the polyol mixture in accordance with the invention are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. the DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Dimethyl terephthalate may be present in amounts ranging from about 6 to 65% of the DMT process residue. Hercules, Inc., Wilmington, Del., sells DMT process residues under the trademark Terate®101. Similar DMT process residues having a different composition but still containing the aromatic esters and acids are also sold by DuPont and others. The DMT process residues to be transesterified preferably have a functionality at least slightly greater than 2.

A suitable DMT residue is disclosed in U.S. Pat. No. 3,647,759, and suitable transesterified polyol mixtures are described in U.S. Pat. No. 4,237,238. Another suitable DMT residue and suitable transesterified polyol mixtures made therefrom are described in U.S. Pat. No. 4,411,949.

Other preferred aromatic polyester polyols are those produced by digesting polyalkylene terephthalate, especially polyethylene terephthalate (PET), residues or scraps with organic polyols, such as the digestion products disclosed in U.S. Pat. Nos. 4,233,068, 4,417,001, 4,469,824, 4,529,744, 4,539,341 and 4,604,410, U.S. patent application Ser. No. 756,107, and European patent application Nos. 83102510.1 and 84304687.1. Still other especially useful aromatic polyester polyols are the aromatic Chardol polyols of Chardonol Corporation, and the aromatic Stepanpol polyols of Stepan Company.

The polyols which can be employed alone or in combination with polyester polyols in the preparation of the carbon black-filled polyurethane and polyisocyanurate foam compositons of the invention include monomeric polyols and polyether polyols. The polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. Polyol blends such as a mixture of high molecular weight polyether polyols with lower molecular weight polyether polyols can also be employed.

The polyurethane foams can be prepared by reacting the polyol and polyisocyanate on a 0.7:1 to 1.1:1 equivalent basis. In an advantageous embodiment of the invention wherein the polyester polyols are combined with another polyol(s) to produce polyurethane foams, the polyester polyols can comprise about 5 to 100, preferably about 5 to 75, and more preferably about 20 to 50, weight percent of the total polyol content in the foam preparations. The polyisocyanurate foams of the invention are advantageously prepared by reacting the polyisocyanate with a minor amount of polyol, such as sufficient polyol to provide about 0.10 to 0.70 hydroxyl equivalents of polyol per equivalent of said polyisocyanate, wherein the polyester polyol comprises about 5 to 100, and preferably about 50 to 100, weight percent of the total polyol content in the foam preparations.

Any suitable blowing agent can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2$, trifluorochloropropane, difluorochloromethane, 1-fluoro-1,1-dichloroethane, 1,1-trifluoro-2,2-dichloroethane, 1,1-difluoro-1-chloroethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

The foams also can be produced using a froth-foaming method, such as the one disclosed in U.S. Pat. No. 4,572,865. In this method, the frothing agent can be any material which is inert to the reactive ingredients and is easily vaporized at atmospheric pressure. The frothing agent advantageously has an atmospheric boiling point of −50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, and the like. The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris(dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896.

Other additives may also be included in the foam formulations. Included are nonreactive and reactive flame retardants, such as tris(2-chloroethyl)-phosphate, dispersing agents, plasticizers, mold release agents, antioxidants, and other fillers and pigments. The use of such additives is well known to those skilled in the art.

The polyisocyanurate and polyurethane foams can be prepared by mixing together the organic polyisocyanate with the polyol and other foam-forming ingredients, including the carbon black, at temperature ranging from out 0° C. to 150° C. Any order of mixing is acceptable provided that the carbon black is homogenously blended into the foam-forming formulation and the reaction of the polyisocyanate and isocyanate-reactive compound does not begin until all components are mixed. In a preferred embodiment, a mixture comprising the polyisocyanate, blowing or foaming agent and carbon black is formed, and then this mixture is combined with the remaining components, whereupon the total mixture is foamed.

Various methods for introducing and dispersing carbon black into the foam-forming system can be employed and will be described with respect to the production of polyisocyanurate foam. One method utilizes a continuous two-stage media mill (e.g., Netzsch VM System) to perform the dispersion. In this system, dry carbon black pellets and polyisocyanate are metered into a coarse grind stage. After passing through, this predispersion is pumped directly to the fine-grind stage and milled to the desired fineness. The carbon black/isocyanate mixture is then cooled in-line and transferred to either a batching or storage tank for further processing.

Another method utilizes a high speed impingement mill (e.g., Kinetic Dispersions' Kady Mill). Carbon black pellets and isocyanate are metered into the mill and dispersed to the desired fineness in a single pass. As in the previous method, the dispersion is then pumped through a heat-exchanger and into either a batching or storage tank.

A third method involves a two-stage, semi-batch process wherein carbon black and isocyanate are first metered into one or more high speed disc dispersers (e.g., Hockmeyer). This stage reduces the carbon black pellet size and raises the mix temperature to promote more efficient fine-grinding. This pre-dispersion stage should be handled in a batch fashion in order to insure a consistent carbon black loading and prevent short circuiting of carbon black pellets through this stage. The resultant carbon black/isocyanate mixture is then pumped to a small media mill (e.g., Netzsch) using a peristaltic pump. The mixture is ground to the desired fineness in the mill, cooled and transferred to batching or storage tanks. The media mill is operated in a continuous fashion requiring proper staging of the pre-dispersion step.

One method of utilizing the resultant carbon black/polyisocyanate mixture in the foam-forming process of the invention can be illustrated with reference to the apparatus shown in FIG. 1. The apparatus includes tanks 10, 11 and 12 for containing the foamable ingredients and additives such as surfactant, dye, blowing agent, etc. In operation, the tanks are charged with the foam-forming mixture in whatever manner is convenient and preferred for the specific polymer. For instance, in the production of the isocyanurate foam, the foam-forming mixture can be divided into three liquid components, with the carbon black/polyisocyanate mixture, blowing agent and surfactant in tank 10, the polyol in tank 11, and the catalyst in tank 12, each respectively connected to outlet lines 13, 14 and 15. The temperatures of the ingredients are controlled to ensure satisfactory processing. The lines 13, 14 and 15 form the inlet to metering pumps 16, 17, and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

In operation, tank 10 is charged with the organic polyisocyanate admixed with the carbon black, blowing agent and surfactant, and tank 11 is charged with the polyol, and tank 12 is charged with the catalyst composition. The speeds of the pumps 16, 17 and 18 are adjusted to give the desired ratios of the ingredients contained in the tanks 10, 11 and 12, whereupon these ingredients pass respectively into lines 13, 14 and 15. When a froth-foaming process is conducted, the frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the over 34, the core expands under the influence of heat added by the hot air from vents 35 and 35' and due to the heat generated in the exothermic reaction between the polyol and isocyanate in the presence of the catalyst. The temperature within the oven is controlled by varying the temperaure of the hot air from vents 35, 35', in order to ensure that the temperature within the oven 34 is maintained within the desired limits of 100° F. to 300° F. and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous modifications to the above-described apparatus will be immediately apparent to those skilled in the art. For example, the tanks 10, 11 and 12 can be provided with refrigeration means in order to maintain the reactants at subambient temperatures.

Any facing sheet previously employed to produce building panels can be employed in the present invention. Examples of suitable facing sheets include, among others, those of kraft paper, aluminum, asphalt impregnated felts, and glass fiber mats as well as laminates of two or more of the above.

The foam materials of the invention can also be used, with or without a facer(s), for pipe insulation, pour-in-place applications, bunstock, spray foam and the like.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the need for uniform carbon black dispersion in rigid foam insulation products to achieve a superior insulating efficiency.

A. ISOCYANURATE FORMULATIONS USED IN PREPARING FOAM CORE OF STRUCTURAL LAMINATES

Three different isocyanurate formulations, which are presented in the following Table I, were used in the continuous free-rise production of carbon black-filled structural laminates.

TABLE I

| Item | FORMULATION 1 Ingredient | Parts by Weight[6] |
|---|---|---|
| A | Polymethylene polyphenyl isocyanate[1] | 230 |
| B | Trichloromonofluoromethane | (See Table II below) |
| B[1] | Dichlorodifluoromethane | 6 |
| C | Silicone surfactant[2] | 3.5 |
| D | Carbon black[3] | (See Table II below) |
| E | Aromatic polyester polyol[4] | 70 |
| F | Catalyst[5] | 8–12 |

[1]Item A is a polymethylene polyphenyl isocyanate having an equivalent weight of 140, an acidity of 0.03% HCl, and a viscosity of 2000 centipoises at 25° C. and is available from the Mobay Chemical Company, Pittsburgh, Pa. under the trade name MONDUR MR-200.
[2]Item C is that supplied by the Union Carbide Corporation under the trade name Y-10222.
[3]Item D is that supplied by Cabot Corporation under the trade name Cabot Sterling R.
[4]Item E is that supplied by Sloss Industries Corporation under the trade name Foamol 250.
[5]Item F is a blend of 2,4,6-tris(dimethylaminomethyl)-phenol:potassium-2-ethylhexoate:diethylene glycol in a .77:4.62:4.62 weight ratio.
[6]The weight of carbon black is not included in the total weight in calculating the listed parts by weight of each ingredient.

| Item | FORMULATION 2 Ingredient | Parts by Weight[4] |
|---|---|---|
| A | Polymethylene polyphenyl isocyanate[1] | 232 |
| B | Trichloromonofluoromethane | (See Table II below) |
| C | Silicone surfactant[1] | 2 |
| D | Carbon black[1] | (See Table II below) |
| E | Aromatic polyester polyol[2] | 68 |
| F | Catalyst[3] | 8–12 |

[1]Of Formulation 1 above.
[2]Item E is that supplied by Stepan Company under the trade name Stepanpol PS-3152C.
[3]Item F is a blend of potassium acetate:potassium-2-ethylhexoate: 2,4,6-tris(dimethylaminomethyl)phenol:diethylene glycol in a 1.18:1.62:0.69:6.51 weight ratio.
[4]The weight of carbon black is not included in the total weight in calculating the listed parts by weight of each ingredient.

| Item | FORMULATION 3 Ingredient | Parts by Weight[3] |
|---|---|---|
| A | Polymethylene polyphenyl isocyanate[1] | 190 |
| B | Trichloromonofluoromethane | (See Table II below) |
| C | Silicone surfactant[1] | 2 |
| D | Carbon black[1] | (See Table II below) |
| E | Aromatic polyester polyol[2] | 110 |
| F | Catalyst[2] | 8–12 |

[1]Of Formulation 1 above.
[2]Of Formulation 2 above.
[3]The weight of carbon black is not included in the total weight in calculating the listed parts by weight of each ingredient.

B. PRODUCTION OF STRUCTURAL LAMINATES

The use of the above formulations in the production of structural laminates A to N of Table II below can be illustrated with reference to FIG. 1 of the drawings. For each carbon black filled structural laminate, tank 10 was charged with a dispersion of items A, B, C and D, tank 11 was charged with item E, and tank 12 was charged with item F. The tanks were similarly charged for the unfilled comparative products except that item D was omitted from tank 10. In the production of each structural laminate, the top and bottom facers utilized are shown in Table II below.

The facers were fed from rolls 30 and 30' toward the nip of metering rolls 32 and 33, and the pumps 16, 17 and 18 were started to discharge the contents of the tanks 10, 11 and 12 into the respective feed lines to carry the ingredients to the mixing head 29. In the case of insulation boards A to F, item B[1] was injected into the isocyanate-containing component at an opening formed into conduit 13. The mixing head 29 deposited the foam forming mixture onto the lower facer and both upper and lower facers and foamable mixture were then conveyed into the oven 34 to produce each of structural laminates A to N.

C. PROPERTIES OF STRUCTURAL LAMINATES

1. General Testing

The above-described structural laminates were subjected to physical testing designed to evaluate faced foam plastic insulation board. Testing of both the core foam (reported in Table III) and the whole faced product (reported in Table IV) revealed that all properties of the carbon black-filled products and the control products were comparable with the exception of friability. Although the filled foams were appreciably more friable than the controls, no deleterious effects on facer adhesion or product handleability were observed. Full hot mopping with 475° F. asphalt of structural laminates A to F resulted in no blistering, no warping and only slight froth.

2. Testing of Fire Resistance

Corner fire tests were performed at Jim Walter Research Corp. (JWRC), St. Petersburg, Fla. to compare the burning characteristics of a carbon black-filled structural laminate and an unfilled structural laminate. The testing methods were the JWRC 8 Foot Corner Test, which is a ⅓ scale version of the well-known Factory Mutual (FM) 25 Foot Building Corner Fire Test, and the JWRC Room-Corner Test, which corresponds to the ICBO Room Corner Test. The results presented in Table V demonstrate that the carbon black-filled structural laminate was comparable in fire resistance to the unfilled structural laminate.

3. Testing of Aged K-Factors

Table VI shows k-factor measurements made periodically on carbon black-filled and unfilled control structural laminates which were aged at ambient temperature. The results were mixed, with the carbon black addition yielding a range of 0 to 8.3% improvement at 180 days of ambient aging. Photomicrographs of foam cell walls showed the most uniform carbon black dispersion in the cell walls of product with the greatest improvement. In samples with little or no improvement, the carbon black was clustered at the cell struts or highly agglomerated in a portion of the cell walls leaving other cell walls subtantially transparent.

TABLE II
PRODUCTION OF STRUCTURAL LAMINATE

| Structural Laminate | Formulation Utilized | Thickness (in) | Carbon Black Level (% by weight of total polymer) | Trichlorofluoromethane Level (parts by weight) |
|---|---|---|---|---|
| A[1] | 1 | 1.2 | 7.5 | 42.5 |
| B[1] | 1 | 1.2 | 5 | 41.5 |
| C[1] | 1 | 1.2 | 0 | 39.5 |
| D[1] | 1 | 2.0 | 7.5 | 42.5 |
| E[1] | 1 | 2.0 | 5 | 41.5 |
| F[1] | 1 | 2.0 | 0 | 39.5 |
| G[2] | 2 | 1.0 | 5 | 54.0 |
| H[2] | 2 | 1.0 | 0 | 52.5 |
| I[2] | 2 | 2.0 | 5 | 54.0 |
| J[2] | 2 | 2.0 | 0 | 52.5 |
| K[3] | 3 | 0.5 | 5 | 51.0 |
| L[3] | 3 | 0.5 | 0 | 49.0 |
| M[3] | 3 | 1.0 | 5 | 51.0 |
| N[3] | 3 | 1.0 | 0 | 49.0 |

[1]Top and bottom facers are each a glass fiber mat.
[2]Top and bottom facers are each an aluminum foil.
[3]Top facer is an aluminum foil/kraft paper/aluminum foil trilaminate; bottom facer is aluminum foil.

TABLE III
PROPERTIES OF CORE FOAM

| Structural Laminate | Thickness (in) | Carbon Black Level (%)[1] | Density (lbs/ft$^3$) | Closed Cells[2] (%) | Friability[3] (% wt loss) | Compressive Strength[4] (psi) | Oxygen Index[5] | Tunnel Test[6] (flame spread/smoke) | Dimensional Stability[7] (% linear change $\frac{MD + TD}{2}$, 28 Days) | | |
|---|---|---|---|---|---|---|---|---|---|---|---|
| | | | | | | | | | −40° C. | 70° C./ 95% RH | 125° C. |
| A | 1.2 | 7.5 | 1.81 | 85.4 | 27.2 | 23 | — | 27.1/107 | −.03 | 4.86 | 1.14 |
| B | 1.2 | 5 | 1.78 | 77.8 | 14.8 | 22 | — | 28.0/113 | .17 | 1.61 | −.57 |
| C | 1.2 | 0 | 1.74 | 81.6 | 16.5 | 22 | 24.8 | — | 0 | 1.71 | 1.44 |
| D | 2.0 | 7.5 | 1.81 | 84.0 | 29.3 | 24 | 25.5 | 28.0/148 | .06 | 4.87 | 2.10 |
| E | 2.0 | 5 | 1.79 | 77.9 | 26.6 | 24 | 25.4 | 25.4/161 | .03 | 3.86 | 2.26 |
| F | 2.0 | 0 | 1.65 | 79.3 | 14.6 | 21 | 24.6 | — | −.03 | 5.17 | 4.71 |
| G | 1.0 | 5 | 1.65 | 86.7 | 26.6 | 16 | — | 27.7/80 | −.05 | 1.33 | 1.38 |

TABLE III-continued
PROPERTIES OF CORE FOAM

| Structural Laminate | Thickness (in) | Carbon Black Level (%)[1] | Density (lbs/ft[3]) | Closed Cells[2] (%) | Friability[3] (% wt loss) | Compressive Strength[4] (psi) | Oxygen Index[5] | Tunnel Test[6] (flame spread/smoke) | Dimensional Stability[7] (% linear change $\frac{MD + TD}{2}$, 28 Days) −40° C. | 70° C./ 95% RH | 125° C. |
|---|---|---|---|---|---|---|---|---|---|---|---|
| H | 1.0 | 0 | 1.70 | 87.4 | 12.5 | 25 | 25.8 | — | 0 | 2.30 | .98 |
| I | 2.0 | 5 | 1.65 | 86.5 | 52.1 | 19 | 27.4 | 25.4/108 | −.10 | 1.60 | .74 |
| J | 2.0 | 0 | 1.71 | 88.4 | 26.0 | 24 | 26.6 | — | .04 | 3.38 | 2.57 |
| K | 0.5 | 5 | 1.67 | 82.6 | — | — | — | — | −.07 | 3.89 | −.64 |
| L | 0.5 | 0 | 1.70 | 86.6 | — | — | — | — | −.01 | 6.96 | 3.50 |
| M | 1.0 | 5 | 1.67 | 87.5 | 10.1 | 20 | 23.9 | 24.8/133 | .01 | 6.21 | 1.94 |
| N | 1.0 | 0 | 1.63 | 86.5 | 4.3 | 20 | 23.2 | — | .04 | 10.66 | 10.77 |

[1] % by weight of total polymer.
[2] According to Air Comparison Pycnometer.
[3] According to ASTM C421.
[4] According to ASTM D1621.
[5] According to ASTM D2863.
[6] According to ASTM E84.
[7] According to ASTM D2126.

TABLE IV
PROPERTIES OF STRUCTURAL LAMINATE

| Structural Laminate | Thickness (in) | Carbon Black Level (%)[1] | Density (lbs/ft[3]) | Water Absorption[2] (% by volume) | Water Vapor Transmission[3] (perms) | Dimensional Stability[4] (% linear change $\frac{MD + TD}{2}$, 28 Days) −40° C. | 70° C./95% RH | 125° C. |
|---|---|---|---|---|---|---|---|---|
| A | 1.2 | 7.5 | 2.02 | — | 2.59 | −.11 | 1.11 | .52 |
| B | 1.2 | 5 | 1.98 | — | 2.71 | −.06 | .44 | −.15 |
| C | 1.2 | 0 | 1.97 | — | 2.69 | −.13 | .88 | .82 |
| D | 2.0 | 7.5 | 1.97 | 1.52 | — | −.05 | 1.00 | .38 |
| E | 2.0 | 5 | 1.92 | 1.25 | — | −.06 | 1.60 | .53 |
| F | 2.0 | 0 | 1.78 | 1.06 | — | −.06 | 2.04 | 1.74 |
| G | 1.0 | 5 | — | — | <.03 | −.17 | .02 | −.05 |
| H | 1.0 | 0 | — | — | <.03 | −.12 | .10 | .08 |
| I | 2.0 | 5 | — | .82 | — | −.09 | .50 | .23 |
| J | 2.0 | 0 | — | .67 | — | −.24 | 1.23 | 1.03 |
| K | 0.5 | 5 | — | — | — | −.13 | .29 | −.16 |
| L | 0.5 | 0 | — | — | — | −.11 | .77 | .48 |
| M | 1.0 | 5 | — | .73 | <.03 | −.33 | 1.79 | 1.55 |
| N | 1.0 | 0 | — | .63 | <.03 | −.66 | 2.50 | 3.57 |

[1] % by weight of total polymer.
[2] According to ASTM C272, 24 hours.
[3] According to ASTM E96.
[4] According to ASTM D2126.

TABLE V
LARGE-SCALE FLAMMABILITY TESTING

| | Structural Laminate I | Control[3] |
|---|---|---|
| JWRC 8' Corner Test[1]: | | |
| Maximum Radiometer Reading, Btu/ft[2] sec | 0.132 | 0.127 |
| Maximum Temperature, #1 thermocouple, °F. | 1860 | 1960 |
| Length of time flames out short (12 ft) wall, sec | 12 | 12 |
| Maximum flame travel on long (16 ft) wall, ft | 10 | 8 |
| Product damage: | | |
| foam missing in corner, ft[2] | 45 | 15 |
| foam charred, ft[2] | 45 | 95 |
| Performance | Satisfactory | Satisfactory |
| JWRC Room Corner Test[2]: | | |
| Maximum Radiometer Reading, Btu/ft[2] sec | 0.422 | 0.421 |
| Smoke Level | 2 ft below door | 2 ft below door |
| Product damage, charred foam, ft[2] | 50 | 60 |
| Pass/Fail (per ICBO criteria) | PASS | PASS |

[1] According to JWRC Standard F-101D.
[2] According to JWRC Standard F-103B.
[3] Structural laminate J.

TABLE VI

AMBIENT AGED K-FACTORS[1]

| Structural Laminate | Thickness (in) | Carbon Black Level (%)[2] | 14 Days | 30 Days | 45 Days | 60 Days | 90 Days | 120 Days | 150 Days | 180 Days | Δ k at 180 Days (%) |
|---|---|---|---|---|---|---|---|---|---|---|---|
| A | 1.2 | 7.5 | .143 | .148 | .158 | .161 | .163 | .168 | .168 | .168 | −4.0 |
| B | 1.2 | 5.0 | .141 | .145 | .147 | .154 | .161 | .156 | .169 | .167 | −4.6 |
| C | 1.2 | 0   | .153 | .158 | .161 | .165 | .170 | .173 | .172 | .175 | — |
| D | 2.0 | 7.5 | .143 | .140 | .145 | .152 | .156 | .159 | .170 | .167 | −5.1 |
| E | 2.0 | 5.0 | .138 | .147 | .154 | .151 | .162 | .157 | .165 | .166 | −5.7 |
| F | 2.0 | 0   | .142 | .158 | .151 | .158 | .166 | .161 | .166 | .176 | — |
| G | 1.0 | 5.0 | .118 | .114 | .120 | .123 | .138 | .134 | .125 | .132 | −2.9 |
| H | 1.0 | 0   | .121 | .118 | .122 | .122 | .128 | .135 | .134 | .136 | — |
| I | 2.0 | 5.0 | .122 | .126 | .126 | .127 | .131 | —    | .140 | .135 | 0 |
| J | 2.0 | 0   | .119 | .128 | .127 | .122 | .134 | .131 | .135 | .135 | — |
| K | 0.5 | 5.0 | .116 | .113 | .116 | .115 | .116 | .120 | .119 | .120 | −3.2 |
| L | 0.5 | 0   | .117 | .115 | .118 | .120 | .121 | .124 | .121 | .124 | — |
| M | 1.0 | 5.0 | .116 | .117 | .120 | .121 | .120 | .121 | .125 | .122 | −8.3 |
| N | 1.0 | 0   | .120 | .122 | .125 | .124 | .129 | .124 | .127 | .133 | — |

[1]K-factor testing conducted according to ASTM C518 and k-factors expressed in Btu-in/hr-ft$^2$-°F.
[2]% by weight of total polymer.

EXAMPLE 2

This example illustrates the use of several different carbon blacks, including both fluffy and pelleted types, as fillers for polyisocyanurate foam.

A. DISPERSION OF CARBON BLACKS IN ISOCYANATE

The particle sizes and structures of the carbon blacks studied are shown in Table VII below.

Two mills were used to disperse the carbon blacks in an isocyanate: a high-speed disk disperser and a high-speed impingement mill.

The high-speed disk disperser (Hockmeyer) utilizes a single motor-driven disk to disperse particles within a vehicle. This device relies on high blade tip-speed (4,000–6,000 ft./min.) and high shear forces to effect the dispersion. Disk dispersers are capable of dispersing most fluffy blacks and some softer pelleted blacks.

The high-speed impingement mill (Kinetic Dispersions' Kady Mill) utilizes a high-speed slotted rotor contained within a slotted stator to mechanically reduce the particle size. In this device, particles and vehicle are drawn into the center of the rotor and accelerated to a velocity of approximately 9,000 ft./min. On leaving the rotor, the particles impact inside the slots in the stator, thus breaking the particles apart. This type of mill relies on low fluid viscosity in order to accelerate the particles and achieve the necessary size reduction. The nature of the rotor/stator device tends to heat viscous fluids very rapidly, lowering their viscosity and improving grinding efficiency. This type of mill will handle all fluffy blacks and pelleted blacks having a low structure and large particle size.

The ease of dispersion in isocyanate of both the fluffy and pelleted carbon blacks of Table VII was evaluated using the above-described Hockmeyer and Kady Mills. All the carbon blacks were milled into Mondur MR-200, the isocyanate employed in producing the foams. Test data relating to the grinding efficiencies in the dispersal of the various carbon blacks in isocyanate are presented in Table VIII below.

In testing the fluffy blacks, a 13.6% by weight mixture of carbon black in isocyanate was prepared by hand stirring the black into the isocyanate. The resulting premixes were then milled using the Hockmeyer disperser until no further size reduction was noted. The easiest fluffy black to disperse was the one with the largest particle size, viz., Flammruss-101.

Attempts were made to disperse the pelleted blacks with the Hockmeyer disperser but they were generally unsuccessful. However, one pelleted black, the Elftex-115, was dispersed. This particular black utilizes an oil binder which promotes rapid dispersion. Unfortunately, the benefit derived from the oil binder is overshadowed by the oil's action as a defoamer in subsequent foaming, resulting in an inordinately high proportion of open cells.

Three of the pelleted blacks were premixed into the isocyanate at a level of 7.3% by weight (5% in the foam system) and processed in the Kady Mill until no further particle size reduction was noted. A lighter loading of carbon black was used in this phase of the testing because of the difficulty in dispersing pelleted blacks.

Having the largest particle size of the pelleted blacks, Sterling-NSX76 carbon black proved to be the easiest to disperse. The ease of dispersing this black permitted successful evaluation at a 13.6% loading.

TABLE VII

CARBON BLACK PROPERTIES

| Carbon Black | Supplier | Type | Particle Size (Nanometers) | Structure (Oil Absorption)* |
|---|---|---|---|---|
| Monarch-800 | Cabot Corporation | Fluffy | 16 | 115 |
| Elftex-8 | " | Fluffy | 27 | 100 |
| Sterling-R | " | Fluffy | 75 | 71 |
| Flammruss-101 | DeGussa Corporation | Fluffy | 95 | 100 |
| Vulcan-9A32 | Cabot Corporation | Pelleted | 19 | 114 |
| Regal-300I | " | Pelleted | 27 | 72 |
| Elftex-115 | " | Pelleted | 27 | 115 |

TABLE VII-continued
CARBON BLACK PROPERTIES

| Carbon Black | Supplier | Type | Particle Size (Nanometers) | Structure (Oil Absorption)* |
|---|---|---|---|---|
| Sterling-NSX76 | " | Pelleted | 75 | 70 |

*Value indicates the number of milliliters of oil absorbed by 100 g. carbon black. The greater the oil absorption, the higher the particle structure.

TABLE VIII
GRINDING EFFICIENCES IN DISPERSING VARIOUS CARBON BLACKS

| | FLUFFY BLACKS | | | | PELLETED BLACKS | | | |
|---|---|---|---|---|---|---|---|---|
| | Sterling-R | Elftex-8 | Flamm-russ-101 | Monarch-800 | Sterling-NSX76 | Elftex-115 | Regal-300I | Vulcan-9A32 |
| Particle Size (nm) | 75 | 27 | 96 | 16 | 75 | 27 | 27 | 19 |
| Disc Disperser (Hockmeyer) | | | | | | | | |
| Grinding time (min.) | 58 | 30 | 6 | 35 | | 65 | | |
| Hegman level achieved | 7 | 6 | 8 | 2 | | 7.5 | | |
| Initial temp/max temp (°F.) | 78/184 | 78/178 | 78/115 | 78/198 | | 78/200 | | |
| Carbon black loading (wt %) | 13.6[1] | 13.6 | 13.6 | 13.6 | | 13.6 | | |
| High-Speed Impingement Mill (Kinetic Dispersions) | | | | | | | | |
| Grinding time (min.) | | | | | 9 | 18 | 14 | 24 |
| Hegman level achieved | | | | | 8 | 8 | 0 | 8 |
| Initial temp/max temp (°F.) | | | | | 62/195 | 62/222 | 62/212 | 62/227 |
| Carbon black loading (wt %) | | | | | 7.3[2] | 13.6 | 7.3 | 7.3 |

[1]This value represents the weight percent of carbon black in isocyanate required to produce a 10% loading (by weight of total polymer) in Formulation 3 of Example 1.
[2]This value represents the weight percent of carbon black in isocyanate required to produce a 5% loading (by weight of total polymer) in Formulation 3 of Example 1.

B. CARBON BLACK LOADING vs. FOAM PROPERTIES

Studies were conducted to determine the effect of carbon black loading on the aged k-factor, friability and closed cell content of polyisocyanurate foams. For these tests, isocyanurate foams were made using various 13.6% loaded carbon black/isocyanate dispersions from the grinding studies described above. A-components were prepared from the carbon black/isocyanate dispersions, a surfactant and the amount of trichlorofluoromethane blowing agent (R-11B) needed to provide formulations having carbon black loadings of 2.5%, 5.0%, 7.5% and 10.0% by weight of total polymer.

In the foam syntheses, the quantities of the ingredients listed in the following Table IX were combined as indicated below.

TABLE IX

| Item | Ingredient | Parts by Weight[3] |
|---|---|---|
| A | Polymethylene polyphenyl isocyanate[1] | 190 |
| B | Trichloromonofluoromethane | (See Table X below) |
| C | Silicone surfactant[1] | 2 |
| D | Carbon black | (See Table X below) |
| E | Aromatic polyester polyol[2] | 110 |
| F | Catalyst[2] | 8-9 |

[1]Of Formulation 1, Example 1.
[2]Of Formulations 2 and 3, Example 1.
[3]The weight of carbon black is not included in the total weight in calculating the listed parts by weight of each ingredient.

A mixture of items A, B, C and D (the A-component), at a temperature of 15° C., was poured into a reaction vessel. Item E was then added to the vessel, and all ingredients were mixed at 1800 rpm for 10 seconds. Item F was then mixed into the contents of the vessel. All ingredients were thereafter mixed at 1800 rpm for an additional 10 seconds and then poured into a box, yielding a polyisocyanurate foam. A control sample was similarly prepared along with each carbon black tested, using all ingredients of the isocyanurate formulation of Table IX except for the carbon black.

Important properties of the resultant foams are shown in the following Table X. As shown in the table, maximum reduction in aged k-factor occurs at a carbon black loading of 7.5% and foam friability increases with carbon black loading. Closed cell content of the foams did not vary with carbon black loading.

TABLE X
EFFECT OF CARBON BLACK LOADING ON FOAM PROPERTIES

| | Control (Average Values) | Fluffy Black | | | | | | | | | | | |
|---|---|---|---|---|---|---|---|---|---|---|---|---|---|
| | | Sterling-R | | | | Elftex-8 | | | | Flammruss-101 | | | |
| Hegman Grind Level | — | 7 | | | | 6 | | | | 8 | | | |
| Mill Used | — | Hockmeyer | | | | Hockmeyer | | | | Hockmeyer | | | |
| Carbon Black (wt %)[1] | 0 | 2.5 | 5.0 | 7.5 | 10.0 | 2.5 | 5.0 | 7.5 | 10.0 | 2.5 | 5.0 | 7.5 | 10.0 |
| R-11B (parts by weight) | 57.0 | 58.4 | 59.8 | 61.3 | 62.7 | 55.3 | 56.7 | 58.0 | 59.4 | 55.3 | 56.7 | 58.0 | 59.4 |
| Foam Density (pcf) | 1.521 | 1.515 | 1.555 | 1.555 | 1.535 | 1.550 | 1.560 | 1.625 | 1.565 | 1.565 | 1.595 | 1.565 | 1.575 |
| Initial k-factor[2] | .1381 | .1285 | .1285 | .1255 | .1260 | .1300 | .1280 | .1250 | .1665 | .1280 | .1250 | .1240 | .1250 |
| % Improvement. | — | 6.95 | 6.95 | 9.12 | 8.76 | 5.86 | 7.31 | 9.48 | −20.5 | 7.31 | 9.48 | 10.2 | 9.48 |

TABLE X-continued
EFFECT OF CARBON BLACK LOADING ON FOAM PROPERTIES

| | Control | | | | | | | | | | | | |
|---|---|---|---|---|---|---|---|---|---|---|---|---|---|
| over Cont. Aged k-factor[2] (60 day) | .1607 | .1525 | .1570 | .1520 | .1535 | .1510 | .1510 | .1490 | .2240 | .1535 | .1500 | .1470 | .1485 |
| % Improvement over Control | — | 5.10 | 2.30 | 5.41 | 4.48 | 6.04 | 6.04 | 7.28 | −39. | 4.48 | 6.66 | 8.52 | 7.59 |
| Friability[3] (% weight loss) | 12.34 | 36.95 | 36.94 | 40.67 | 45.28 | 19.16 | 28.07 | 37.43 | 40.31 | 28.01 | 31.37 | 32.30 | 44.2 |
| Closed cells[4] (%) | 86.94 | 87.90 | 83.96 | 77.50 | 86.30 | 87.55 | 87.66 | 87.39 | 15.44 | 87.93 | 88.04 | 87.96 | 87.82 |

| | Control (Average Values) | Pelleted Blacks | | | | | | | |
|---|---|---|---|---|---|---|---|---|---|
| | | Sterling-NSX76 | | | | Elftex-115 | | | |
| Hegman Grind Level | — | 8 | | | | 7.5 | | | |
| Mill Used | — | Kinetic Dispersions | | | | Hockmeyer | | | |
| Carbon Black (wt %)[1] | 0 | 2.5 | 5.0 | 7.5 | 10.0 | 2.5 | 5.0 | 7.5 | 10.0 |
| R-11B (parts by weight) | | 55.3 | 56.7 | 58.0 | 59.4 | 55.3 | 56.7 | — | — |
| Foam Density (pcf) | 1.521 | 1.565 | 1.553 | 1.555 | 1.616 | 1.555 | 1.450 | — | — |
| Initial k-factor[2] | .1381 | .1280 | .1260 | .1235 | .1225 | .1270 | .1995 | — | — |
| % Improvement over Control | — | 7.31 | 8.76 | 10.57 | 11.29 | 8.04 | −44.4 | — | — |
| Aged k-factor[2] (60 day) | .1607 | .1495 | .1500 | .1465 | .1490 | .1495 | .2310 | — | — |
| % Improvement over Control | — | 6.97 | 6.66 | 8.84 | 7.28 | 6.97 | −43.7 | — | — |
| Friability[3] (% weight loss) | 12.34 | 25.17 | 34.16 | 32.22 | 38.85 | 25.12 | 40.46 | — | — |
| Closed cells[4] (%) | 86.94 | 87.82 | 86.28 | 86.45 | 86.78 | 88.10 | 19.48 | — | — |

Footnotes for Table X.
[1] Based on total polymer in foam system.
[2] K-factor testing conducted according to ASTM C518 and k-factors expressed in Btu-in/hr-ft[2]-°F.
[3] According to ASTM C421.
[4] According to Air Comparison Pycnometer.

EXAMPLE 3

This example illustrates the use of a pelleted carbon black as filler for rigid polyisocyanurate foam insulation products.

A. DISPERSION OF CARBON BLACK IN ISOCYANATE 421.7 lbs of polymethylene polyphenyl isocyanate (Mondur MR-200) and 50.0 lbs of carbon black beads (Cabot Sterling-NSX76) were thoroughly mixed together in a high-speed disc disperser. The mixing was continued until the temperature of the mixture reached 40° C. This temperature brought the viscosity of the mixture to a suitable level for transfer to a small media mill with a chamber volume of 20 liters (Model LME-20 mill). During this transfer, the carbon black beads were kept in suspension by an air powered mixer, and a peristaltic pump was used for pumping the mixture to the mill.

The carbon black was milled into the isocyanate to a Hegman 8 grind level, and discharged into storage drums. The average retention time in the mill was 2.82 minutes, and an 80% charge of 3.0 millimeter steel media was used. The LME-20 mill produced an outlet temperature of 185° F. using chilled water at 36° F. as the cooling fluid. Dioctyl phthalate was used as the seal fluid for the mill because of its suitable viscosity, lubricating ability and inertness when inadvertently discharged into isocyanurate foam systems. The resulting uniformly dispersed isocyanate/carbon black blend was used in the formulations of Table XI below.

B. PRODUCTION OF STRUCTURAL LAMINATES

The isocyanurate formulations presented in the following Table XI were used in the free-rise production of carbon black-filled structure laminates A to G whose properties are described in Tables XII to XXIV below.

The structural laminates were produced in accordance with the method described in Example 1B for structural laminates G to N. In formulations 1 and 2 of Table XI, the "A" component, which in Example 1B consists of items A, B, C and D, was prepared by first adding to tank 10 the above-described isocyanate/carbon black blend of this example in the quantity shown in Table XI. This viscous blend was transferred to tank 10 from the storage drums using a Viking supply pump. Further isocyanate and the surfactant and blowing agent were then added to complete the "A" component of the formulation. Mixing of this component was achieved through the use of a paddle agitator and recirculation through the Viking supply pump. The "B" (cf item E of Example 1B) and "C" (cf item F of Example 1B) components were added to tanks 11 and 12, respectively. Carbon black was omitted from tank 10 for unfilled formulations 3 and 4. The top and bottom facers utilized for structural laminates A and B were each an aluminum foil and for structural laminates C to G were each an aluminum foil/kraft paper/aluminum foil trilaminate.

The "B" component: "A" component ratios and system viscosities calculated for the production of carbon black-filled structural laminates A, C, D and F are shown in Table XI. The use of foam systems with appreciably higher B/A ratios gave unmanageable system viscosities which resulted in poor chemical mixing and concomitant physical defects in the core foam. The beneficial effect of lowering the viscosity of a carbon black-filled foam system was demonstrated by using dichlorotrifluoroethane (R-123) in place of trichloromonofluoromethane (R-11) as blowing agent in a system having a high B/A ratio (0.400). R-123 is a poorer insulator than R-11 and hence should give higher k-factors with all other variables held constant. However, the use of R-123 yielded both a lower system viscosity and significantly lower k-factors than the R-11 blown foam system.

The data reported in Tables XII to XIV demonstrate the overall good properties of the carbon black-filled structural laminates. The Table XIV results show that carbon black contributes to a significant reduction of the aged k-factor of the foam insulation products.

TABLE XI
FORMULATIONS AND SYSTEM VISCOSITIES OF CARBON BLACK-FILLED AND UNFILLED FOAM SYSTEMS

| | CARBON BLACK-FILLED FOAMS | | UNFILLED FOAMS | |
|---|---|---|---|---|
| | 1 | 2 | 3 | 4 |
| | Parts by Weight | | | |
| "A" COMPONENT | | | | |
| Polymethylene polyphenyl isocyanate/carbon black blend[1] | 212.5 | 212.5 | — | — |
| Polymethylene polyphenyl isocyanate[2] | 42.0 | 42.0 | 232 | 232 |
| Silicone surfactant[3] | 2 | 2 | 2 | 2 |
| Trichloromonofluoromethane | 54 | 54 | 52 | 50 |
| Carbon Black, %[4] | 7.5 | 7.5 | — | — |
| "B" Component | | | | |
| Aromatic polyester polyol 1[5] | 68 | — | 68 | — |
| Aromatic polyester polyol 2[6] | — | 71 | — | 71 |
| B/A Ratio | .219 | .229 | .238 | .250 |
| "C" Component | | | | |
| Catalyst[7] | 8–10 | 8–10 | 8–10 | 8–10 |
| System Viscosities | | | | |
| Calculated System Mix Temperature (°F.)[8] | 61.8 | 61.9 | 61.9 | 62.0 |
| "A" Comp. Viscosity (cps @ system mix temp.) | 610 | 210 | 270 | 270 |
| "B" Comp. Viscosity (cps @ system mix temp.) | 6310 | 3870 | 6250 | 3840 |
| Calculated System Viscosity (cps @ system mix temp.)[9] | 1634 | 1217 | 1419 | 824 |

Footnotes for Table XI.
[1]Of Example 3A above.
[2]Of Example 1, Formulation 1 above.
[3]Of Example 1, Formulation 1 above.
[4]Wt %, based on total polymer in foam system.
[5]Of Example 1, Formulation 2 above.
[6]Polyol is that supplied by Hercules, Inc. under the trade name Terate 202.
[7]Of Example 1, Formulation 2 above.
[8]Calculated based on weighted average method using "A" component at 60° F. and "B" component at 70° F.
[9]Calculated based on weighted average method.

TABLE XII
PRODUCTION OF STRUCTURAL LAMINATE

| Structural Laminate | Formulation Utilized | Thickness (in) | Carbon Black Level (%) | PROPERTIES OF CORE FOAM | | | |
|---|---|---|---|---|---|---|---|
| | | | | Density (lbs/ft[3]) | Closed Cells[2] (%) | Friability[3] (% wt loss) | Compressive Strength[4] (psi) |
| A | 1 | 2.0 | 7.5 | 1.84 | 88.65 | 46.60 | 22 |
| B | 3 | 2.0 | 0 | 1.68 | 85.79 | 28.94 | 20 |
| C | 2 | 1.20 | 7.5 | 1.85 | 87.69 | 7.05 | 22 |
| D | 2 | 1.30 | 7.5 | 1.83 | 86.23 | 15.12 | 23 |
| E | 4 | 1.40 | 0 | 1.64 | 85.47 | 11.51 | 17 |
| F | 2 | 2.0 | 7.5 | 1.85 | 83.51 | 31.02 | 17 |
| G | 4 | 2.0 | 0 | 1.64 | 84.78 | 23.02 | 19 |

| Structural Laminate | Oxygen Index[5] | PROPERTIES OF CORE FOAM DIMENSIONAL STABILITY[6] ($\%$ linear change, $\frac{MD + TD}{2}$ at 28 days) | | | Compressive Strength[4] (psi) | PROPERTIES OF STRUCTURAL LAMINATE DIMENSIONAL STABILITY[6] ($\%$ linear change, $\frac{MD + TD}{2}$ at 28 days) | | |
|---|---|---|---|---|---|---|---|---|
| | | −40° C. | 70° C./95% RH | 125° C. | | −40° C. | 70° C./95% RH | 125° C. |
| A | 28.88 | .0025 | 1.338 | .664 | 23 | −.193 | .371 | .376 |
| B | 26.95 | −.119 | 2.681 | 2.856 | 21 | −.476 | .789 | .929 |
| C | 26.62 | −.0004 | 2.975 | 2.854 | 22 | −.124 | 1.024 | .059 |
| D | 25.88 | −.235 | 5.511 | 7.309 | 22 | −.238 | 1.613 | .634 |
| E | 25.75 | −1.797 | 2.835 | 1.797 | 18 | −.158 | .686 | .432 |
| F | 27.25 | −.289 | 5.042 | 6.671 | 20 | −.198 | .766 | .450 |
| G | 25.75 | −.220 | 4.147 | 3.546 | 20 | −.224 | 1.436 | .934 |

[1]% by weight of total polymer.
[2]According to Air Comparison Pycnometer.
[3]According to ASTM C421.
[4]According to ASTM D1621.
[5]According to ASTM D2863.
[6]According to ASTM D2126.

TABLE XIII

AMBIENT AGED K-FACTORS[1]

| Structural Laminate | Formulation Utilized | Thickness (in) | Carbon Black Level (%)[2] | 14 Days | 30 Days | 60 Days | 90 Days | Δk at 90 Days (%) |
|---|---|---|---|---|---|---|---|---|
| A | 1 | 2.0 | 7.5 | .1223 | .1250 | .1276 | .1313 | −6.86 |
| B | 3 | 2.0 | 0 | .1263 | — | .1370 | — | — |
| C | 2 | 1.20 | 7.5 | .1086 | .1170 | .1140 | .1230 | −9.56 |
| D | 2 | 1.30 | 7.5 | .1170 | .1193 | .1226 | .1196 | −12.05 |
| E | 4 | 1.40 | 0 | .1193 | .1256 | .1326 | .1360 | — |
| F | 2 | 2.0 | 7.5 | .1203 | .1290 | .1273 | .1290 | −5.15 |
| G | 4 | 2.0 | 0 | .1250 | .1280 | .1330 | .1360 | — |

[1]K-factor testing conducted according to ASTM C518 and k-factors expressed in Btu-in/hr-ft$^2$-°F.
[2]% by weight of total polymer.

EXAMPLE 4

This example compares the effect of various fillers on the insulating properties of rigid polyisocyanurate foam products. Aged k-factors of the products were measured to determine the long-term insulating efficiency of the fillers. The fillers, whose performance is shown in FIGS. 2 to 8 of the drawings, are described in the following Table XIV.

TABLE XIV

FOAM FILLERS

| FILLER | TRADE NAME | SUPPLIER | FIG. OF DRAWINGS |
|---|---|---|---|
| Titanium Dioxide | Unitane OR 580 | Kemira Inc. | 2 |
| Calcium Sulfate | | Celotex Corp. | 3 |
| Iron Oxide | RPS-25M | Reade Metals & Minerals Corp. | 4 |
| Kaolin | Al-Sil-Ate-W | Engelhard Corp. | 5 |
| Calcium Carbonate | Gamma-Sperse GS-255 | Georgia Marble Co. | 6 |
| Mica | Micro Mica C-1000 | KMG Minerals Inc. | 7 |
| Carbon Black | Sterling-NSX76 | Cabot Corp. | 8 |

The fillers were tested at the levels presented in FIGS. 2 to 8. In each foam produced with a specific content of filler, the quantities of the ingredients listed in the following Table XV were combined as indicated below.

TABLE XV

| Item | Ingredient | Parts by Weight[3] |
|---|---|---|
| A | Polymethylene polyphenyl isocyanate[1] | 190 |
| B | Trichloromonofluoromethane | (See below[4]) |
| C | Silicone surfactant[1] | 2 |
| D | Filler | (See FIGS. 2 to 8) |
| E | Aromatic polyester polyol[2] | 110 |
| F | Catalyst[2] | 8–9 |

[1]Of Formulation 1, Example 1.
[2]Of Formulations 2 and 3, Example 1.
[3]The weight of filler is not included in the total weight in calculating the listed parts by weight of each ingredient.
[4]Amount required to produce foam having a density of 1.65–1.75 lbs/ft$^3$.

The foams were prepared in accordance with the procedure of Example 2B utilizing the filler contents presented in FIGS. 2 to 8. Each graph shows for a specific filler the relationship between its content in the polyisocyanurate foam and the initial and 90-day k-factor of the filled foam, with the initial and 90-day k-factors of the unfilled control foam shown for the purpose of comparison. The % difference (Δk) between the k-factor values of each filled foam and the control are presented near the data points of each graph.

Figure 7:
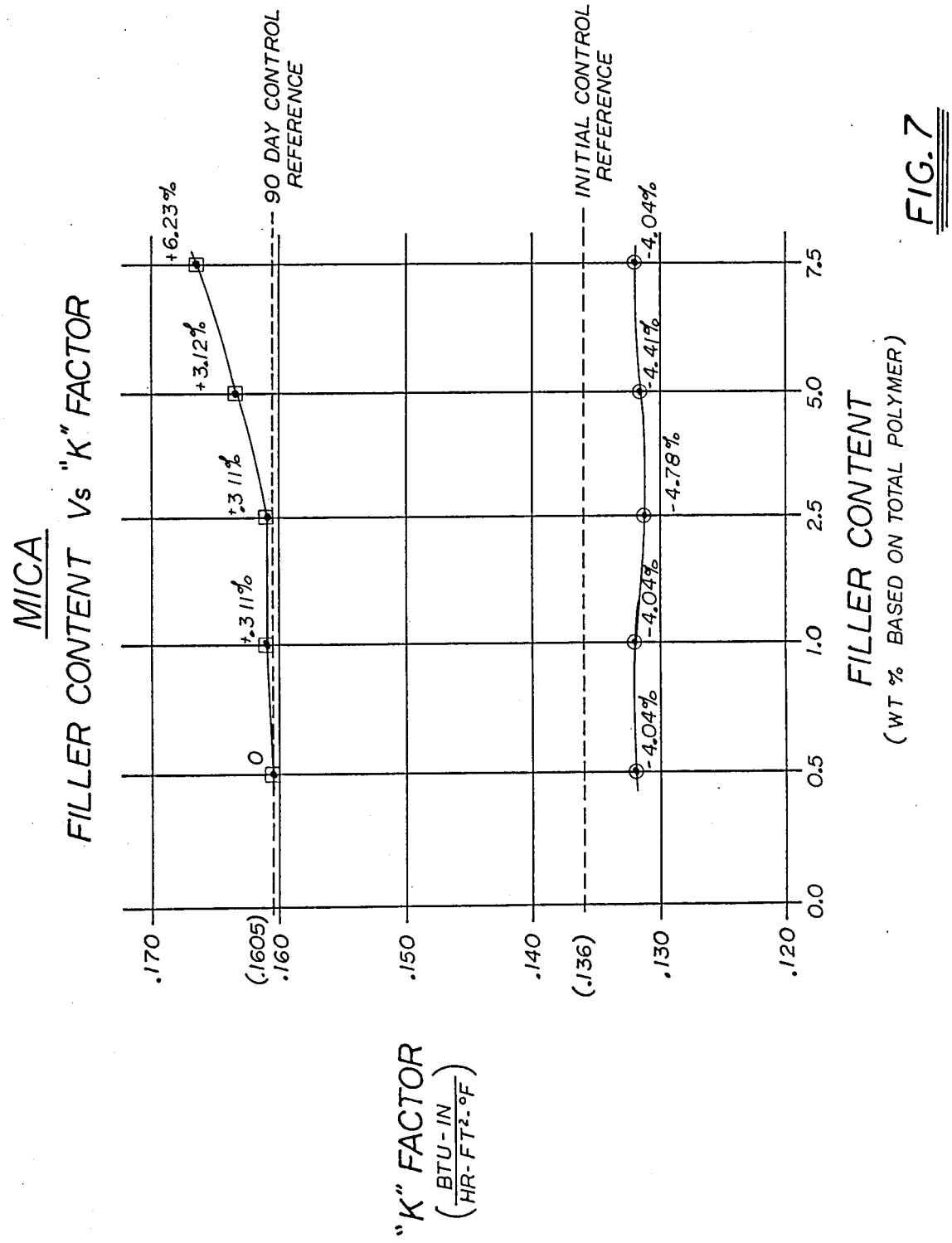

As shown by FIGS. 2 to 8, most of the fillers contribute to little, if any, reduction in the initial k-factor value of the foam. The examples of the Japanese patent application laid open as No. 57-147510 disclose a maximum carbon black level of less than 0.7 wt%, based on the total weight of polymer. This content of carbon black gives an initial reduction in k-factor of less than 3%, as shown by FIG. 8 of the accompanying drawings. The same level of micro-mica is appreciably more effective (FIG. 7). Furthermore, FIG. 8 shows that the initial improvement in k-factor brought about by this low level of carbon black is lost with aging of the foam.

Comparison of FIGS. 2 to 8 reveals the surprisingly superior performance of carbon black in reducing the aged k-factor of foams filled with it. Throughout the entire range from about 2.0 to 7.5 wt%, it alone of all the fillers has the capacity to reduce the aged k-factor of the filled foam to below the aged k-factor of the corresponding unfilled foam.

We claim:

1. A closed cell, rigid, polymer foam prepared from a polymer foam-forming composition containing a foaming agent, the foam containing as filler at lest about 2 percent by weight of carbon black, based on the weight of the polymer in the foam, the carbon black being uniformly dispersed throughout the foam so that there is present in the cell walls of the foam an amount of carbon black which reduces the aged k-factor of the foam to below the aged k-factor of the corresponding unfilled foam having the same density and prepared from the same foam-forming composition as the filled foam except that the carbon black is omitted and the amount of foaming agent is decreased to equalize the densities of the filled and unfilled foams.

2. The foam of claim 1 wherein the carbon black is present in the amount of from about 2 to about 10 percent by weight, based on the weight of the polymer in the foam.

3. The foam of claim 2 wherein the carbon black has a mean particle diameter of from about 10 to about 150 nanometers.

4. The foam of claim 2 wherein the carbon black has a mean particle diameter of from about 40 to about 100 nanometers.

5. The foam of claim 1 wherein the carbon black is present in the amount of from about 4 to about 9 percent by weight, based on the weight of the polymer in the foam.

6. The foam of claim 5 wherein the carbon black has a mean particle diameter of from about 10 to about 150 nanometers.

7. The foam of claim 5 wherein the carbon black has a mean particle diameter of from about 40 to about 100 nanometers.

8. The foam of claim 1 wherein the polymer is a member selected from the group consisting of a polyurethane and a polyisocyanurate.

9. The foam of claim 8 wherein the carbon black is preent in the amount of from about 4 to about 9 percent by weight, based on the weight of the polymer in the foam.

10. The foam of claim 9 wherein the carbon black has a mean particle diameter of from about 10 to about 150 nanometers.

11. The foam of claim 9 wherein the carbon black has a mean particle diameter of from about 40 to about 100 nanometers.

12. The foam of claim 11 wherein the foam-forming composition comprises carbon black, an organic polyisocyanate, a foaming agent, a catalyst, a surfactant and an organic isocyanate-reactive compound selected from the group consisting of a polyether polyol, a polyester polyol and mixtures thereof.

13. A process for producing a carbon black-filled, closed cell, rigid, polymer foam which comprises (a) providing a dispersion of carbon black in a polymer foam-forming composition containing a foaming agent, and (b) thereafter foaming and curing the resultant filled foam-forming composition, the carbon black being added to and uniformly dispersed in the foam-forming composition in an amount which is at least about 2 percent by weight, based on the weight of the polymer in the foam, and which reduces the aged k-factor of the foam to below the aged k-factor of the corresponding unfilled foam having the same density and prepared from the same foam-forming composition as the filled foam except that the carbon black is omitted and the amount of foaming agent is decreased to equalize the densities of the filled and unfilled foams.

14. The process of claim 13 wherein about 2 to about 10 percent by weight of carbon black, based on the weight of the polymer in the foam, is dispersed in the foam-forming composition in step (a).

15. The process of claim 14 wherein the carbon black has a mean particle diameter of from about 10 to about 150 nanometers.

16. The process of claim 14 wherein the carbon black has a mean particle diameter of from about 40 to about 100 nanometers.

17. The process of claim 13 wherein about 4 to about 9 percent by weight of carbon black, based on the weight of the polymer in the foam, is dispersed in the foam-forming composition in step (a).

18. The process of claim 17 wherein the carbon black has a mean particle diameter of from about 10 to about 150 nanometers.

19. The process of claim 17 wherein the carbon black has a mean particle diameter of from about 40 to about 100 nanometers.

20. The process of claim 13 wherein the foam-forming composition comprises a mixture for forming a polymer foam selected from the group consisting of polyurethane and polyisocyanurate foams.

21. The process of claim 20 wherein about 2 to about 10 percent by weight of carbon black, based on the weight of the polymer in the foam, is dispersed in the foam-forming composition in step (a), the carbon black having a mean particle diameter of from about 10 to about 150 nanometers.

22. The process of claim 21 wherein the carbon black has a mean particle diameter of from about 40 to about 100 nanometers.

23. The process of claim 21 wherein the foam-forming composition comprises carbon black, an organic polyisocyanate, a foaming agent, a catalyst, a surfactant and an organic isocyanate-reactive compound selective from the group consisting of a polyether polyol, a polyester polyol and mixtures thereof.

24. The proces of claim 23 wherein an initial dispersion of the carbon black in the organic polyisocyanate is provided and thereafter this initial dispersion is mixed with the other foam-forming ingredients to form the total dispersion which is foamed and cured.

25. A laminate comprising at least one facing sheet adhered to the polymer foam of claim 1.

26. A process for producing a laminate comprising
  (a) contacting at least one facing sheet with the foam-forming composition of claim 13, and
  (b) thereafter foaming and curing the foam-forming composition.

* * * * *